Patented June 23, 1936

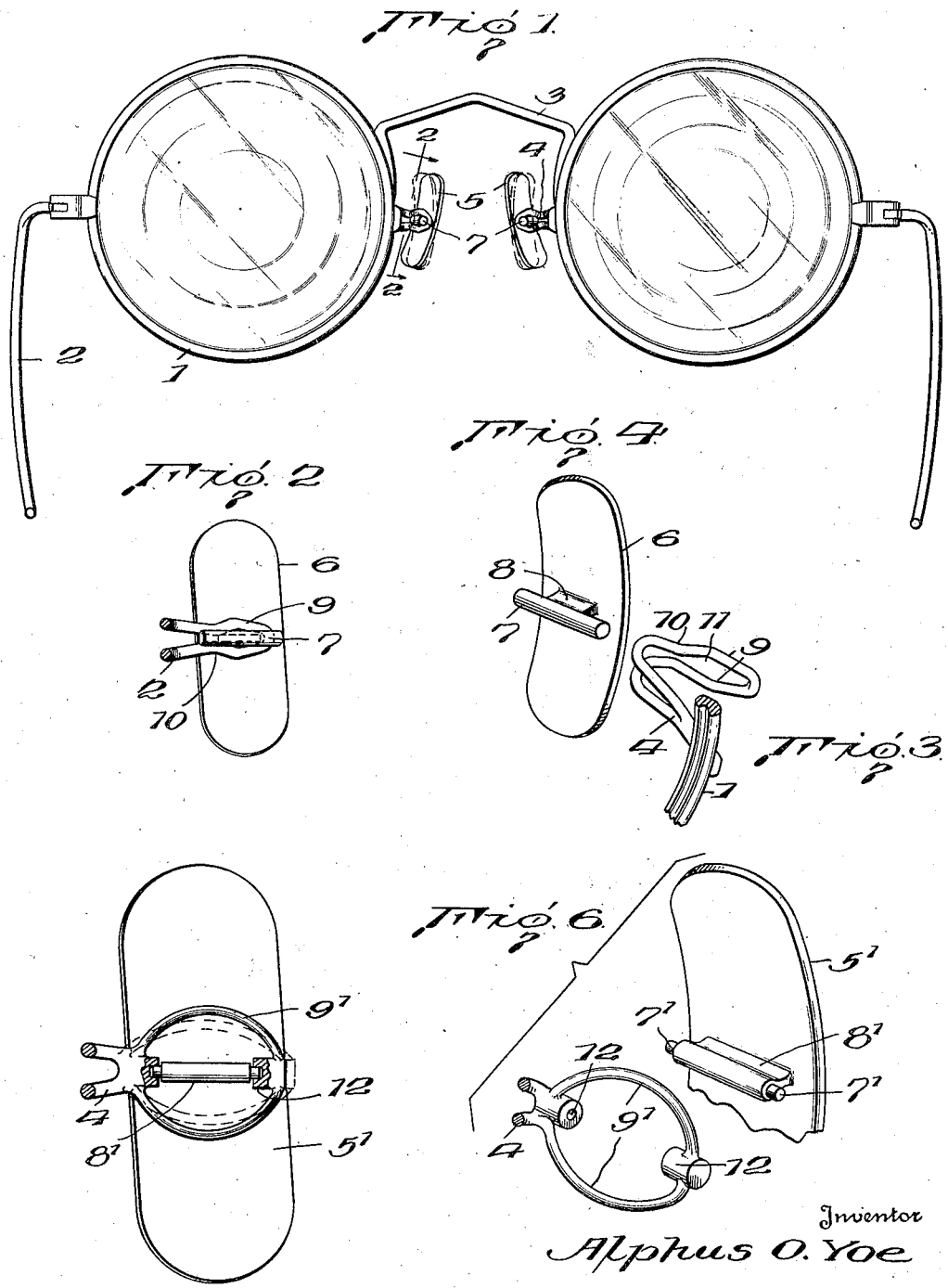

2,045,508

UNITED STATES PATENT OFFICE 2,045,508

OPHTHALMIC MOUNTING

Alphus O. Yoe, Talladega, Ala.

Application March 7, 1935, Serial No. 9,858

5 Claims. (Cl. 88—49)

This invention relates to eyeglasses or spectacles, and particularly to means for securing the nose rests or nose pads to the frame or the bridge of the eyeglasses or spectacles.

At the present time it is the general practice to permanently rivet or braze the nose rests to the eyeglass or spectacle frames, or to a portion of the bridge. The use of such permanently attached nose rests is not entirely satisfactory, as frequently the nose rest which is attached to the frames is not of the proper size, and/or shape to correctly fit the wearer's nose. Furthermore, if the nose rest wears off, it is impossible, or at least exceedingly difficult, to fit new ones to the frames. With the above and other considerations in mind, the present invention is directed to the provision of nose rests which readily may be attached to and detached from the frames, whereby the optician may carry nose rests of assorted sizes and shapes for attachment to the frames, so that the particular frames which the wearer desires may be equipped with nose rests of a size and shape best adapted to fit his nose.

More particularly, the invention comprises a nose rest which preferably has a projection at the back thereof which is removably retained by a support for that purpose which is secured to or carried by the inner edge of the rims, or the lower portion of the bridge member. The support may comprise a resilient wire bent to provide a space into which the projection is forced through a restricted passage, or it may comprise a pair of bearings carried by resilient arms in which the projection is received. In either case, the nose rest is readily movable with respect to the support, as well as removable, so that it is self adjusting to the shape of the nose.

The invention will be illustrated and further described in connection with the accompanying drawing, in which:

Fig. 1 is an elevational view of spectacles embodying the invention, the same being viewed from the side opposite that through which the wearer looks, Fig. 2 is an enlarged sectional view taken on line 2—2 of Fig. 1, Fig. 3 is a perspective view of a portion of the spectacle frame and a support for one of the nose rests, Fig. 4 is a perspective view of one of the nose rests detached from the spectacle frame, Fig. 5 is a view similar to Fig. 2 of a modified form of the invention, and Fig. 6 is a perspective view of the support for the nose rest shown in Fig. 5.

Referring to the drawing, the spectacles comprise rims 1, temple bars 2 and a bridge member 3 of usual construction. Supports 4 for nose rests 5 are secured to the inner edges of the rims or to the lower portion of the bridge member.

Each nose rest comprises an elongated, generally convex portion 6, adapted to rest upon the nose, and a bar 7 secured thereto by a web portion 8, which is narrower than the bar 7.

As best shown in Figs. 2 and 4, the supports 10 for the nose rests each preferably consist of a continuous wire which has a certain amount of resiliency and which has its ends brazed or otherwise secured to the inner edges of the rims and bent to form two vertically-spaced, substantially U-shaped portions having inner legs 9 which are connected at their outer ends and between which the portion 8 of the nose rest is received to removably and adjustably support the nose rest with respect to the support.

The inner legs of the vertically spaced U-shaped portions are pinched together at 10 to form a restricted passage to an enlarged space 11 between them. The nose rests are secured to the supports by forcing the web portions 8 thereof through the restricted passage until they come to rest in the enlarged space 11. The spaces 11 being somewhat larger than the web portions 8, the nose rests will have a limited movement with respect to the supports and thereby automatically adjust themselves to a position to best conform to the shape of the wearer's nose. As soon as the web portions 8 have been forced through the restricted passages and into the enlarged spaces 11, the resiliency of the wire from which the supports are formed returns it to its normal position and the nose rests are retained against accidental removal. However, if it is desired to remove the nose rests in order to substitute others, it is only necessary to force them backward until the web portions clear the restricted passage.

In Figs. 5 and 6 a modified form of the invention is shown. According to that form of the invention, the inner legs 9' of the supports 4' are shaped substantially into the form of a circle and have diametrically opposite bearings 12 to receive the ends of the bars 7' which protrude beyond web portions 8' which connect the bars 7' to the nose rests 5'.

The material from which the circular inner legs 9' are made possesses sufficient resiliency so that the bearings 12 may be separated, as shown in dotted lines in Fig. 5, a distance sufficient to permit the ends of the bars 7' to be inserted or removed merely by pressing the sides of the circle together with suitable pliers.

Bearings 12 are slightly larger than the ends of the bars 7' so that the bars may rotate freely in the bearings to permit the nose rests automatically to adjust themselves to the shape of the wearer's nose. However, if it should be desired to prevent relative movement between the nose rests and the support, it is only necessary that the sides of the circle which carries the bearings 12 be bent so that they bear against the back of the nose rests.

The invention has been described in detail in connection with nose rests for spectacles, but it is to be understood that the same is equally as well adapted for use with eyeglasses. It is also to be understood that the foregoing detailed explanation and disclosure of the invention is by way of exemplification, and the same is not limited thereby, except as may be specifically set forth in the appended claims.

I claim:

1. In eyeglasses or spectacles, a nose rest, a support for said nose rest, a rigid bar carried by said nose rest, a web portion extending substantially at right angles to the rear face of said nose rest and integrally connecting said bar to the nose rest, said support having portions spaced to provide a restricted passage therebetween and adapted to straddle said web portion to detachably secure the nose rest to the support.

2. In eyeglasses or spectacles, a nose rest, a support for said nose rest, a rigid bar carried by said nose rest, a web portion extending substantially at right angles to the rear face of said nose rest and integrally connecting said bar to the nose rest, said support having portions spaced to provide a restricted passage therebetween and adapted to straddle said web portion to detachably and adjustably secure the nose rest to the support.

3. In spectacles, a nose rest, a support for said nose rest, said support comprising a continuous resilient wire secured to the inner edges of the rims of the spectacles and bent to form two spaced substantially U-shaped portions, and a projection carried by the nose rest and removably retained between the spaced inner legs of the respective U-shaped portions.

4. In eyeglasses or spectacles, a nose rest, a support for said nose rest, said support having a pair of opposed bearings, a pintle secured to the back of said nose rest and movable in said bearings, at least one of said bearings being carried by bowed resilient arms, whereby said bearings may be separated to permit insertion or removal of said pintle by pressing the bowed arms towards each other.

5. In eyeglasses or spectacles, a nose rest, a support for said nose rest, comprising a continuous member having spaced resilient portions, and a projection carried by the nose rest and positioned between the spaced resilient portions of the support, parts of said spaced resilient portions detachably retaining said projection in place on said support.

ALPHUS O. YOE.